United States Patent Office 3,467,506
Patented Sept. 16, 1969

3,467,506
CATALYTIC CONVERSION OF LIQUID PETROLEUM HYDROCARBONS
André Roche, Toulouse, France, assignor to Office National Industriel de l'Azote, Toulouse, France, a corporation of France
No Drawing. Filed Nov. 15, 1965, Ser. No. 507,670
Claims priority, application France, Nov. 20, 1964, 5,027
Int. Cl. C01b 2/16
U.S. Cl. 48—214                                    9 Claims

ABSTRACT OF THE DISCLOSURE

A process for the catalytic reforming of liquid petroleum hydrocarbons with steam under high pressure in two stages to form a gas mixture that is substantially hydrogen, carbon monoxide and carbon dioxide in which the catalyst employed in the second stage is conventional but the catalyst employed in the first stage is a mixture of nickel or cobalt or iron, initially in the form of oxide, and at least one alkaline earth metal oxide, said mixture having a refractory support of at least one alkali silicate and at least one alkaline earth metal silicate. The preferred alkaline earth oxide is magnesium oxide and about 25% of the total catalyst composition may be silicates of which a predominant amount may be aluminum silicate.

---

A process for the catalytic and high pressure reforming with steam of natural (methane-containing) gas or light petroleum hydrocarbons that can yield, according to the operating conditions, gases of widely different compositions, without formation of undesirable deposits of carbon, is known. This known process requires the use of highly active and specific catalysts, the nature and composition of which are a function of the product which it is desired to obtain.

The present invention is concerned with a variant of the reforming process applicable to liquid petroleum hydrocarbons and presenting the advantage of being particularly economical with respect to the active (catalytic) masses employed.

The process according to this invention, involves the use of two different types of conversion catalysts or catalytic masses, in successive contact with which—e.g. while passing therethrough in succession—the starting mixture of initially liquid petroleum hydrocarbons and steam is subjected successively to two different reactions. The initially liquid petroleum hydrocarbons are advantageously first vaporized before being admixed with the steam. The mixture passing through the second of the two catalytic masses is specifically different from that passing through the first catalyst mass, since a reaction takes place in contact with the latter.

The essence of the invention resides in the composition of the first catalyst mass. Broadly stated, the first catalytically active mass traversed by the mixture to be subjected to reforming is constituted by a polymetallic catalyst consisting of nickel, cobalt and/or iron (preferably initially in oxide form), one or more metals of the platinum group (e.g. platinum black, palladium), one or more oxides of alkaline earth metals, supported on a special refractory support constituted by alkali silicates and/or alkaline earth silicates. Specific exemplifications of this first catalyst mass will be detailed hereinafter. The metal(s) of the platinum group may be omitted, although inclusion thereof is preferable.

The second catalyst mass is of a per se conventional type, of low nickel content, such as customarily employed in the catalytic conversion of natural gas or methane-rich gases. A typical second catalyst mass composition will hereinafter be specifically exemplified.

According to the invention, the initial mixture of hydrocarbon and steam, moderately preheated—preferably sufficiently to vaporize the hydrocarbon—is passed through the first layer or mass of catalyst whereby, in contact with the latter, the said mixture is involved in the slightly exothermic reaction which takes place as follows:

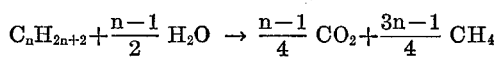

(I)

This reaction proceeds quantitatively at temperatures lower than 600° C.

The reaction mixture resulting from reaction (1) then passes through the second catalyst mass or layer, wherein the methane formed reacts with the carbon dioxide and with excess steam according to the following per se conventional reactions:

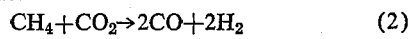 (2)

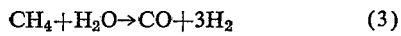 (3)

The ratio of the respective volumes of the two catalyst masses or layers varies between 1:4 (1st catalyst:second catalyst) and 1:1, according to the grade of the starting hydrocarbon and the desired composition of the final gas.

The invention is carried out in equipment commonly employed in the reforming of hydrocarbons under pressure, the two layers of catalyst being disposed in the same catalyst chamber. It is also possible to dispose the two layers in two separate catalyst chambers arranged in series, the first in a primary reactor constituted by a suitably insulated pressure chamber, and the second in e.g. a bundle of catalyst-holding tubes constituting the second reactor, preheating of the reaction mixture entering into the primary reactor being effected, if desired, by heat exchange with heating gases or with gases leaving the second reactor.

In the event the invention is applied to the reforming or undesulfurized petroleum hydrocarbons, which may not be totally vaporizable, as is the case with light fuel oils, it is particularly advantageous to utilize the two catalyst chambers-in-series mode of operation and, furthermore, to employ two primary reactors which feed alternately to the bundle in the secondary reactor via a desulfurization furnace under pressure. The catalyst contained in the primary reactors can, with this arrangement, be periodically regenerated, the regeneration being effected during the phase wherein a primary reactor is out of operation. It will be understood in this regard that such regeneration takes place only after rather long operating periods.

If the first catalyst mass were employed alone, in a composition formulated to enable the reforming reaction (1) to proceed without the formation of carbon black, it would be necessary to use a much higher temperature or to greatly increase the volume of catalyst employed, in order to achieve results comparable with those realized by this invention. Otherwise stated, the method of the present invention makes it possible, for a given ratio of volume of petroleum hydrocarbon vapor being reformed/volume of catalyst to operate at a considerably reduced temperature and thus to contribute to the longevity of the apparatus, more especially the catalyst carrying-tubes. It will thus be seen that, according to the invention, the first phase of the reaction is carried out in contact with a catalyst of relatively reduced activity, but specific to a methane-forming reaction, occasionally with formation of very minor amounts of ethane but always with exclusion of formation of free carbon; the reaction is then concluded in contact with a per se known and commercially available highly active classical catalyst for the conversion of methane, or methane-containing gas, by means of steam.

A notable characteristic of the first catalyst mass is found in the nature of its support which indispensably contains, in addition to combined aluminum silicate in the hydraulic binding agent (alumina cement), free silicates of aluminum, of magnesium and of alkali metals. The catalyst mass is conveniently prepared by homogeneously admixing the constituents in pulverulent state (e.g. nickel oxide, platinum black, etc., caustic magnesia, purified silicates of alumina, of magnesium and of alkali metals), wetting the homogeneous mixture with 2 to 4% by weight of water, incorporating alumina cement into the resultant pasty mass, and shaping the catalyst particles e.g. by pelletizing. The pastry admixture can also be shaped by extrusion.

The following sets forth presently preferred exemplary embodiments of the invention, it being understood however, that these are intended to be illustrative and not at all limitative of the invention.

Example 1

A pressure-resistant reactor tube disposed vertically in a heating furnace is charged with 49.5 liters of conventional catalyst for natural gas reforming with steam and superposed on this conventional catalyst are 16.5 liters of a reforming catalyst according to this invention, on a special refractory support constituted by silicates of aluminum, magnesium, sodium and potassium.

55 liters per hour of previously desulfurized light petroleum distillate of specific gravity 0.667 at 15° C. and distilling between 45° C. and 105° C. are admixed with 175 kilograms per hour of steam, and this mixture—preheated to 500° C.—is fed into the top of the vertical reactor tube, the operating pressure in the latter being 20.5 kilograms per square centimeter.

The mixture passes successively through the aforesaid two catalyst masses.

Under these conditions, there are obtained at a temperature of 750° C., measured at the lower end of the catalyst-holding tube, 171.0 cubic meters per hour of gas under a pressure of 20.0 kilograms per square centimeter containing:

| | |
|---|---|
| $CO_2$ _____percent by weight__ | 16.5 |
| $H_2$ _____do____ | 66.7 |
| $CO$ _____do____ | 9.7 |
| $CH_4$ _____do____ | 7.1 |
| Steam _____cubic meters per hour__ | 145.7 |

By operating under the same conditions, but employing separate series-connected reactors for the primary and secondary reaction catalytic masses, after the manner hereinbefore described, similar results are achieved. At the outlet of the primary reactor containing the polymetallic catalyst, the production is 92.0 cubic meters per hours of gas containing:

| | |
|---|---|
| $CO_2$ _____percent by weight__ | 22.0 |
| $H_2$ _____do____ | 38.0 |
| $CO$ _____do____ | 1.0 |
| $CH_4$ _____do____ | 39.0 |
| Steam _____cubic meters per hour__ | 177.4 |

The composition of the two catalyst masses employed in this example is as follows:

(1) First catalyst layer (catalyst mass according to this invention):

| | Percent by wt. |
|---|---|
| NiO | 25 |
| Pt | 0 |
| MgO | 20 |
| $MgSiO_3$ | 5 |
| $Al_2(SiO_3)_3$ | 20 |
| $Na_2SiO_3$ | 2 |
| $K_2SiO_3$ | 3 |
| Binder [1] | 25 |

[1] The binder in all exemplified compositions is per se conventional hydraulic alumina cement.

(2) Second catalyst layer (per se conventional):

| | Percent by wt. |
|---|---|
| NiO | 25 |
| Pt | 0 |
| MgO | 23 |
| $MgSiO_3$ | 0 |
| $Al_2(SiO_3)_3$ | 27 |
| $Na_2SiO_3$ | 0 |
| $K_2SiO_3$ | 0 |
| Binder | 25 |

The procedure in all succeeding examples is the same as that in Example 1, except for the changes specifically indicated in each example.

Example 2

Initial mixture: 60 liters per hour of petroleum distillate + 276 cubic meters of steam per hour (ratio: steam/distillate=4).

Composition of first catalyst layer:

| | Percent by wt. |
|---|---|
| NiO | 20.0 |
| Pd | 0.006 |
| MgO | 20.0 |
| $MgSiO_3$ | 5.0 |
| $Al_2SiO_3$ | 25.0 |
| $Na_2SiO_3$ | 2.0 |
| $K_2SiO_3$ | 3.0 |
| Binder | 24.994 |

The composition of the second catalyst layer is identical with that of Example 1.

The distillate has a density of 0.726 at 15° C., distils between 40 and 278° C. The initial mixture is preheated to 550° C. The operating pressure is 40 atmospheres. At the outlet from the first layer, there are obtained, at 600° C., 119 cubic meters per hour of gas (and 218 cubic meters per hour of steam), and at the outlet from the second layer, at 790° C., 192 cubic meters per hour of gas (and 190 cubic meters per hour of steam).

Composition of the reaction products:

| | From 1st layer (percent) | From 2d layer (percent) |
|---|---|---|
| $CO_2$ | 23.4 | 17.25 |
| $CO$ | 2.1 | 10.35 |
| $H_2$ | 42.0 | 64.05 |
| $CH_4$ | 32.5 | 8.35 |

Example 3

Initial mixture: 60 liters per hour of petroleum distillate + 312 cubic meters per hour of steam (ratio: steam/distillate=5).

The petroleum distillate is identical with that of Example 1.

The initial mixture is preheated to 550° C.

The catalyst of the second layer is the same as that of Example 1, while the first catalyst layer composition is:

| | Percent by wt. |
|---|---|
| NiO | 25.0 |
| Pt | 0.004 |
| MgO | 20.0 |
| $MgSiO_3$ | 5.0 |
| $Al_2(SiO_3)_3$ | 20.0 |
| $Na_2SiO_3$ | 2.0 |
| $K_2SiO_3$ | 3.0 |
| Binder | 24.996 |

The operating pressure is 16 atmospheres. At the outlet from the first layer, at 600° C., there are obtained 143.4 cubic meters per hour of gas + 246 cubic meters per hour of steam, and at the outlet from the second layer, at 800° C., there are obtained 220 cubic meters per hour of gas + 218 cubic meters per hour of steam.

The composition of the reaction products is as follows:

|  | From 1st layer (percent) | From 2d layer (percent) |
|---|---|---|
| $CO_2$ | 21.40 | 15.75 |
| $CO$ | 2.75 | 11.00 |
| $H_2$ | 56.50 | 71.70 |
| $CH_4$ | 19.35 | 1.55 |

Example 4

Initial mixture: 55 liters per hour of petroleum + 233.2 cubic meters per hour of steam (ratio: steam/distillate=4).

The distillate has a density of 0.708 at 15° C., and distils between 48 and 184° C. The initial mixture is preheated to 550° C.

The catalyst of the second layer is identical with that of Example 1, while the first layer composition is:

Percent by wt.

| | |
|---|---|
| NiO | 30.2 |
| Pt | 0.002 |
| MgO | 20.0 |
| $MgSiO_3$ | 0 |
| $Al_2(SiO_3)_3$ | 20.0 |
| $Na_2SiO_3$ | 2.0 |
| $K_2SiO_3$ | 3.0 |
| Binder | 24.998 |

At the outlet from the first layer, at 600° C., there are obtained 106.8 cubic meters per hour of gas + 183 cubic meters per hour of steam, and at the outlet from the second layer, there are obtained, at 775° C., 168.7 cubic meters per hour of gas + 160 cubic meters per hour of steam.

The composition of the reaction products is as follows:

|  | From 1st layer (percent) | From 2d layer (percent) |
|---|---|---|
| $CO_2$ | 22.3 | 16.75 |
| $CO$ | 2.3 | 10.15 |
| $H_2$ | 45.45 | 65.45 |
| $CH_4$ | 29.95 | 7.65 |

Pd or Pt can be used interchangeably in the preceding examples; use can also be made of other platinum group catalysts.

The proportions of silicates are considerably variable. At least one and preferably two alkaline earth metal silicates must be present. Thus, magnesium silicate may be omitted entirely (cf. Example 4). The silicates preferably consist predominantly of aluminum silicate with minor amounts of potassium silicate and sodium silicate, but at least one and preferably two alkali metal silicates are present. The total quantity of silicates amounts to about 25% by weight or slightly more of the total catalyst composition.

What is claimed is:

1. In a process for the catalytic reforming of hydrocarbons with steam under high pressure wherein the initial mixture of hydrocarbons and steam is successively passed through two successive reforming catalytic masses and the product of the first of said catalytic masses consists substantially of hydrogen, carbon dioxide and methane and the product of the second of said catalytic masses consists substantially of carbon monoxide, hydrogen and carbon dioxide, the improvement according to which the hydrocarbon is initially liquid petroleum hydrocarbon distillate, the first catalyst mass is a polymetallic catalyst consisting of at least one member selected from the group consisting of nickel, cobalt and iron initially in the form of oxide, and at least one alkaline earth metal oxide, said first catalyst mass being supported on a refractory support of at least one alkali silicate and at least one alkaline earth metal silicate.

2. The improvement according to claim 1, wherein the alkaline earth metal oxide is magnesium oxide and the support is constituted by magnesium silicate, aluminum silicate, sodium silicate and potassium silicate.

3. The improvement according to claim 1, wherein the alkaline earth metal oxide is magnesium oxide and the support is constituted by aluminum silicate, sodium silicate and potassium silicate.

4. The improvement according to claim 1, wherein the silicates constitute about 25 to 30% by weight of the total first catalyst composition and comprise a predominant amount of one to two alkaline earth metal silicates and a minor amount of one to two alkali metal silicates.

5. The improvement according to claim 1, wherein the first catalyst mass also comprises at least one metal of the platinum group.

6. The improvement according to claim 1, wherein the petroleum hydrocarbon is vaporized before being passed through the first catalyst mass.

7. The improvement according to claim 5, wherein the petroleum hydrocarbon is vaporized before being passed through the first catalyst mass.

8. The improvement according to claim 5, wherein the alkaline earth metal oxide is magnesium oxide and the support is constituted by magnesium silicate, aluminum silicate, sodium silicate and potassium silicate.

9. The improvement according to claim 5, wherein the alkaline earth metal oxide is magnesium oxide and the support is constituted by aluminum silicate, sodium silicate and potassium silicate.

References Cited

UNITED STATES PATENTS

| 2,907,647 | 10/1959 | Linden | 48—214 |
| 2,942,960 | 6/1960 | Gerhold | 48—214 XR |
| 3,119,667 | 1/1964 | McMahon. | |
| 3,144,414 | 8/1964 | Silverman | 252—459 XR |
| 3,168,587 | 2/1965 | Michaels et al. | 252—459 XR |
| 3,201,214 | 8/1965 | Fox et al. | 48—214 |
| 3,205,182 | 9/1965 | Padovani et al. | 252—459 XR |
| 3,264,066 | 8/1966 | Quartulli et al. | 48—197 XR |
| 3,334,055 | 8/1967 | Dowden et al. | 48—214 XR |

MORRIS O. WOLK, Primary Examiner

R. E. SERWIN, Assistant Examiner

U.S. Cl. X.R.

252—459